(12) United States Patent
Bayne et al.

(10) Patent No.: US 10,870,601 B2
(45) Date of Patent: Dec. 22, 2020

(54) GLASS WEB SEPARATING DEVICES AND METHODS

(71) Applicant: CORNING INCORPORATED, Corning, NY (US)

(72) Inventors: John Frederick Bayne, Elmira, NY (US); Scott Winfield Deming, Elmira, NY (US); Todd Benson Fleming, Elkland, PA (US); Andrew Peter Kittleson, Honeoye Falls, NY (US); Gautam Narendra Kudva, Horseheads, NY (US); Dale Charles Marshall, Brockport, NY (US); Eric Lee Miller, Corning, NY (US)

(73) Assignee: Corning Incorporated, Corning, NY (US)

( * ) Notice: Subject to any disclaimer, the term of this patent is extended or adjusted under 35 U.S.C. 154(b) by 330 days.

(21) Appl. No.: 15/780,044

(22) PCT Filed: Nov. 30, 2016

(86) PCT No.: PCT/US2016/064105
§ 371 (c)(1),
(2) Date: May 30, 2018

(87) PCT Pub. No.: WO2017/095859
PCT Pub. Date: Jun. 8, 2017

(65) Prior Publication Data
US 2018/0362388 A1    Dec. 20, 2018

Related U.S. Application Data

(60) Provisional application No. 62/261,553, filed on Dec. 1, 2015.

(51) Int. Cl.
*C03B 33/03* (2006.01)
*C03B 33/033* (2006.01)
(Continued)

(52) U.S. Cl.
CPC .......... *C03B 33/033* (2013.01); *B65G 49/065* (2013.01); *C03B 17/064* (2013.01); *C03B 33/0235* (2013.01)

(58) Field of Classification Search
CPC ................................ C03B 33/03; C03B 33/13
See application file for complete search history.

(56) References Cited

U.S. PATENT DOCUMENTS 3,800,991 A    4/1974 Grove et al.
3,865,672 A    2/1975 Metzinger et al.
(Continued)

FOREIGN PATENT DOCUMENTS

JP    5418977 B2    2/2014
WO    2011084561 A1    7/2011
WO    2014209833 A1    12/2014

OTHER PUBLICATIONS

International Search Report and Written Opinion of the International Searching Authority; PCT/US2016/064105; dated Mar. 16, 2017; 12 Pages; Korean Patent Office.

*Primary Examiner* — Cynthia Szewczyk
(74) *Attorney, Agent, or Firm* — Ryan T. Hardee (57) ABSTRACT

A method of separating a glass web includes the steps of placing the glass web in tension by applying an in-plane tension to the glass web in a tensile direction and producing a region of increased tension on a first major surface of the glass web by imparting a curvature in the glass web. The method further includes separating the glass web along a separation path parallel to an axis of the curvature and transverse to the tensile direction by applying a defect to a portion of the first major surface in the region of increased tension.

20 Claims, 5 Drawing Sheets

(51) Int. Cl.
*B65G 49/06* (2006.01)
*C03B 33/023* (2006.01)
*C03B 17/06* (2006.01)

(56) References Cited

U.S. PATENT DOCUMENTS

| | | |
|---|---|---|
| 5,303,861 A | 4/1994 | Allaire et al. |
| 6,502,423 B1 | 1/2003 | Ostendarp et al. |
| 8,656,738 B2 | 2/2014 | Joseph, II et al. |
| 9,932,259 B2 | 4/2018 | Hasegawa et al. |
| 2002/0001059 A1* | 1/2002 | Tatemura .......... G02F 1/133351 349/187 |
| 2006/0249553 A1 | 11/2006 | Ukrainczyk |
| 2007/0039990 A1 | 2/2007 | Kemmerer et al. |
| 2007/0275338 A1 | 11/2007 | Acker et al. |
| 2011/0084561 A1 | 4/2011 | Swales et al. |
| 2012/0247154 A1 | 10/2012 | Abramov et al. |
| 2013/0126576 A1 | 5/2013 | Marshall et al. |
| 2014/0120626 A1 | 5/2014 | Stubbs et al. |
| 2014/0130649 A1* | 5/2014 | Chang ................. C03B 33/0235 83/26 |
| 2014/0209833 A1 | 7/2014 | Naoi et al. |
| 2015/0065065 A1 | 3/2015 | Rofougaran et al. |
| 2015/0259236 A1 | 9/2015 | Marshall et al. |
| 2015/0315059 A1 | 11/2015 | Abramov et al. |
| 2016/0272456 A1 | 9/2016 | Cho et al. |

* cited by examiner

GLASS WEB SEPARATING DEVICES AND METHODS

CROSS-REFERENCE TO RELATED APPLICATIONS

This application claims the benefit of priority under 35 U.S.C. § 371 of International Patent Application Serial No. PCT/US2016/064105, filed on Nov. 30, 2016, which in turn, claims the benefit of priority of U.S. Provisional Application Ser. No. 62/261,553 filed on Dec. 1, 2015, the contents of each of which are relied upon and incorporated herein by reference in their entireties.

BACKGROUND

It is known to separate a continuous glass ribbon to form various products including glass sheets for liquid crystal displays (LCDs), electrophoretic displays (EPD), organic light emitting diode displays (OLEDs), plasma display panels (PDPs), or the like. The glass sheets are commonly fabricated by flowing molten glass to a forming body whereby the continuous glass ribbon may be formed by a variety of ribbon forming processes including slot draw, float, down-draw, fusion down-draw, or up-draw. The glass ribbon may then be subsequently divided to provide sheets of glass suitable for further processing into a desired display application.

SUMMARY

The following presents a simplified summary of the disclosure to provide a basic understanding of some exemplary embodiments described in the detailed description.

The present disclosure relates generally to separating a glass web and, more particularly, to separating a glass web along a separation path by applying a defect to the glass web.

In accordance with some embodiments, a method of separating a glass web can include the steps of placing the glass web in tension by applying an in-plane tension to the glass web in a tensile direction and producing a region of increased tension on a first major surface of the glass web by imparting a curvature in the glass web. The method can further include separating the glass web along a separation path parallel to an axis of the curvature and transverse to the tensile direction by applying a defect to a portion of the first major surface in the region of increased tension.

In one embodiment, the glass web can include a thickness within a range of from about 50 μm to about 500 μm.

In another embodiment, the glass web can separate along the separation path in response to the application of the defect.

In another embodiment, the separating can include applying the defect to the portion of the first major surface in the region of increased tension while the in-plane tension is applied to the glass web and while the curvature is imparted in the glass web.

In another embodiment, the separating can include applying the defect to the portion of the first major surface in the region of increased tension within a distance of greater than zero and less than or equal to about 25 mm from an outer edge of the glass web.

In another embodiment, the defect can include a depth from the first major surface of from about 25% to 100% of a thickness of the glass web.

In another embodiment, the separating can include applying the defect to the portion of the first major surface in the region of increased tension without contacting the glass web with a solid object.

In another embodiment, the separating can include applying the defect with a laser.

In another embodiment, the producing a region of increased tension can include imparting the curvature in the glass web without contacting the glass web with a solid object.

In another embodiment, the producing a region of increased tension can include imparting the curvature with a cushion of air.

In another embodiment, the method can further include the step of continuously conveying the glass web in a travel direction coincident with the tensile direction while applying the in-plane tension, while imparting the curvature, and while applying the defect.

In another embodiment, the region of increased tension can include a tensile bending stress from the imparted curvature and an in-plane tensile stress from the applied in-plane tension.

In another embodiment, at an apex of the curvature within the region of increased tension, the first major surface can include an axis of maximum tensile stress parallel to the axis of the curvature.

In another embodiment, the axis of maximum tensile stress can include tensile stress within a range from about 15 MPa to about 30 MPa.

In another embodiment, opposite the apex of the curvature, a second major surface of the glass web can include a second axis of stress parallel to the axis of the curvature, wherein tensile stress along the axis of maximum tensile stress can be greater than tensile stress along the second axis of stress.

In another embodiment, opposite the apex of the curvature, a second major surface of the glass web can include an axis of compressive stress parallel to the axis of the curvature.

In another embodiment, the axis of maximum tensile stress can be coincident with the separation path.

In another embodiment, the separating can include applying the defect to the portion of the first major surface at a location on the axis of maximum tensile stress.

In another embodiment, the producing a region of increased tension can include imparting the curvature across an entire width of the glass web, and the axis of maximum tensile stress can extend along the entire width.

In another embodiment, the axis of maximum tensile stress can include a uniform stress across the entire width of the glass web.

In another embodiment, a method of processing a glass web can include forming the glass web from a quantity of molten material with a process selected from the group consisting of: a fusion down draw process, a slot draw process, a float process, a down-draw process and an up-draw process. The method can further include the step of separating the glass web in accordance with any of the embodiments discussed above.

It is to be understood that both the foregoing general description and the following detailed description present embodiments of the present disclosure, and are intended to provide an overview or framework for understanding the nature and character of the embodiments as they are described and claimed. The accompanying drawings are included to provide a further understanding of the embodiments, and are incorporated into and constitute a part of this specification. The drawings illustrate various embodiments of the disclosure and, together with the description, serve to explain the principles and operations thereof.

BRIEF DESCRIPTION OF THE DRAWINGS

These and other features, aspects, and advantages of the present disclosure can be further understood when read with reference to the accompanying drawings.

DETAILED DESCRIPTION

Apparatus and methods will now be described more fully hereinafter with reference to the accompanying drawings in which exemplary embodiments are shown. Whenever possible, the same reference numerals are used throughout the drawings to refer to the same or like parts. However, this disclosure may be embodied in many different forms and should not be construed as limited to the embodiments set forth herein.

Glass sheets are commonly fabricated by flowing molten glass to a forming body whereby a glass ribbon may be formed by a variety of ribbon forming processes including, float, slot draw, down-draw, fusion down-draw, up-draw, or any other forming processes. The glass ribbon from any of these processes may then be subsequently divided to provide glass sheets suitable for further processing into a desired application, e.g., a display application. For example, the glass sheets can be used in a wide range of display applications, including liquid crystal displays (LCDs), electrophoretic displays (EPD), organic light emitting diode displays (OLEDs), plasma display panels (PDPs), or the like. Glass sheets may need to be transported from one location to another. The glass sheets may be transported with a conventional support frame designed to secure a stack of glass sheets in place. Moreover, interleaf material can be placed between each sheet of glass to help prevent contact and therefore preserve the pristine surfaces of the glass sheets.

It is to be understood that specific embodiments disclosed herein are intended to be exemplary and therefore non-limiting. As such, the present disclosure relates to methods and apparatus for separating a glass web. In some embodiments, the glass web to be separated can include a glass ribbon formed from a glass manufacturing apparatus. In some embodiments, the glass ribbon can be provided as it is being formed from a glass manufacturing apparatus, can be provided from a spool of previously-formed glass ribbon that can be uncoiled from the spool, or can be provided as a freestanding glass ribbon. In other embodiments, the glass web can include a glass sheet formed by a glass manufacturing apparatus. In some embodiments, the glass sheet can be provided as a freestanding glass sheet, a glass sheet separated from a glass ribbon, a glass sheet separated from another glass sheet, a glass sheet uncoiled from a spool of glass sheets, or a glass sheet from a stack of glass sheets.

In some embodiments, the separated portion of the glass web can comprise an edge portion (e.g., a glass web edge portion, an edge portion including a thickened edge bead, etc.) that may be discarded or otherwise processed. In further embodiments, the separated portion of the glass web may comprise one or more additional glass webs any or several of which may include one or more glass ribbons. In one embodiment, a glass ribbon being formed from a glass manufacturing apparatus can be separated into a glass ribbon having a desired length. In another embodiment, the glass ribbon being formed from a glass manufacturing apparatus can be wound onto a spool of glass ribbon and the glass ribbon can be separated to provide the spool with a desired amount of glass ribbon. In another embodiment, the glass ribbon can be uncoiled from a spool of glass ribbon and separated to obtain a desired length of freestanding glass ribbon. In still another embodiment, a freestanding glass ribbon can be separated to provide another freestanding glass ribbon having a desired length.

In other embodiments, the one or more additional glass webs separated from the glass web can include a glass sheet. In some embodiments, the glass sheet can be separated from a glass ribbon being formed from a glass manufacturing apparatus, can be separated from a glass ribbon being uncoiled from a spool of glass ribbon, or can be separated from a freestanding glass ribbon. In still other embodiments, the glass sheet can be separated from another glass sheet (e.g., that may have been previously separated from a glass ribbon, previously separated from still another glass sheet, and/or previously formed by a glass manufacturing apparatus).

Figure 1:
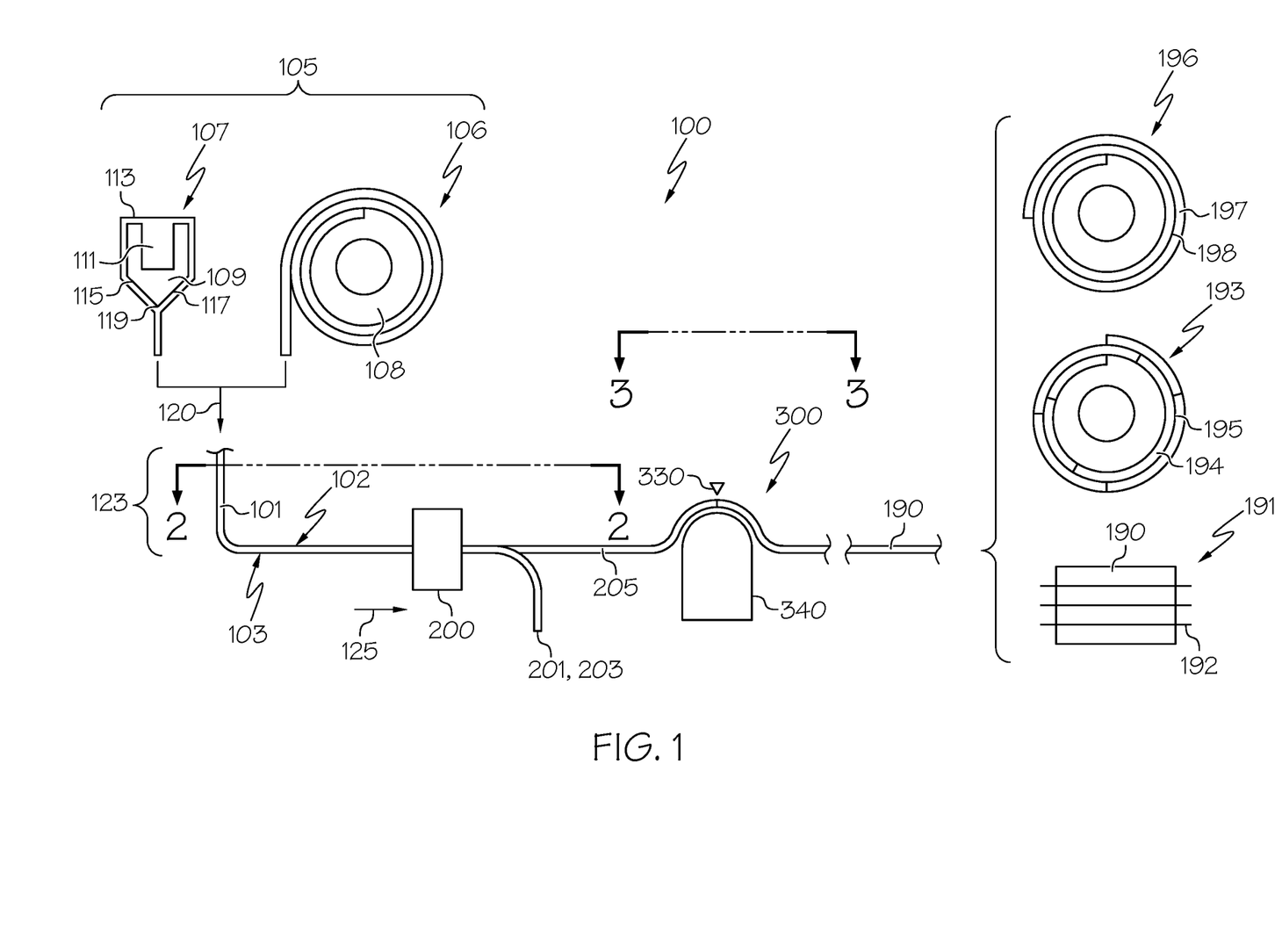
FIG. 1 schematically illustrates an exemplary glass manufacturing apparatus in accordance with embodiments disclosed herein.

Methods and apparatus for separating a glass web will now be described by way of exemplary embodiments for separating a glass sheet from a glass ribbon with the understanding that similar or identical techniques may also be applied to separate any glass web, such as the exemplary glass webs discussed above. FIG. 1 schematically illustrates a glass processing apparatus 100 for processing a glass web comprising a glass ribbon 101. The glass ribbon 101 can be provided by a variety of different sources 105 of glass ribbon 101. FIG. 1 illustrates two exemplary sources 105 of glass ribbon 101, although other sources 105 may be provided in further embodiments. For instance, as shown in FIG. 1, the source 105 of glass ribbon 101 can include a down draw glass forming apparatus 107. As schematically shown, the down draw glass forming apparatus 107 can include a forming wedge 109 at the bottom of a trough 111. In operation, molten glass 113 can overflow the trough 111 and flow down opposite sides 115, 117 of the forming wedge 109. The two sheets of the molten glass 113 are subsequently fused together as they are drawn off a root 119 of the forming wedge 109. As such, the glass ribbon 101 may be fusion down drawn to traverse in a downward direction 120 off the root 119 of the forming wedge 109 and directly into a zone 123 positioned downstream from the down draw glass forming apparatus 107. While the description herein refers to fusion down draw methods of forming glass, it should be noted that other forming methods and sources 105 for the glass ribbon 101 are within the scope of the claims appended herewith such as, but not limited to, as slot draw, float, down-draw, or up-draw methods of forming.

As further illustrated in FIG. 1, another exemplary source 105 of glass ribbon 101 can include a coiled spool 106 comprising glass ribbon 101 wound onto a core 108. Glass ribbon 101 may be wound onto the core 108 into the coiled spool 106 after being previously drawn into a glass ribbon 101 with the down draw glass forming apparatus 107 or any other glass forming apparatus. In operation, the glass ribbon 101 may be uncoiled from the coiled spool 106 of glass ribbon 101 and traversed in the downward direction 120 into the zone 123. The glass ribbon 101 can then be traversed in a travel direction 125 for subsequent processing of the glass ribbon 101. In some embodiments, subsequent processing may optionally include removing edge portions 201, 203 from a central portion 205 of the glass ribbon 101 with an edge separation apparatus 200, adding electronic components (e.g., electronic display components) to a major surface of the glass ribbon, laminating the glass ribbon, machining the edges of the glass ribbon, or other processing techniques. In further embodiments, the subsequent processing may include processing with a separation apparatus 300 to separate the glass web as discussed more fully below.

Regardless of the source 105 or method of production, the glass ribbon 101 can, in some embodiments, have a thickness of less than or equal to about 0.5 millimeters, less than or equal to about 500 micrometers, such as less than or equal to about 300 micrometers, such as less than or equal to about 200 micrometers, or such as less than or equal to about 100 micrometers, although other thicknesses may be used in further embodiments. In other embodiments, the thickness can be from about 100 micrometers to about 0.5 millimeters, from about 300 micrometers to about 0.4 millimeters, or from about 0.3 millimeters to about 500 micrometers, and all sub-ranges therebetween. In some embodiments, the thickness of the glass ribbon 101 can be from about 50 micrometers to about 500 micrometers, such as from about 50 micrometers to about 300 micrometers, such as from about 50 micrometers to about 200 micrometers, such as from about 50 micrometers to about 100 micrometers, and all ranges and subranges therebetween. In some embodiments, the glass ribbon 101 can include a thickness (e.g., a thickness 104) between a first major surface 102 and a second major surface 103) within a range of from about 50 micrometers to 500 micrometers, although other thicknesses may be provided in further embodiments.

In some embodiments, the glass ribbon 101 can have a width of greater than or equal to about 20 mm, such as greater than or equal to about 50 mm, such as greater than or equal to about 100 mm, such as greater than or equal to about 500 mm, such as greater than or equal to about 1000 mm, such as greater than or equal to about 2000 mm, such as greater than or equal to about 3000 mm, such as greater than or equal to about 4000 mm, although other widths less than or greater than the widths mentioned above can be provided in further embodiments.

In some embodiments, the width of the glass ribbon 101 can be from about 20 mm to about 4000 mm, such as from about 50 mm to about 4000 mm, such as from about 100 mm to about 4000 mm, such as from about 500 mm to about 4000 mm, such as from about 1000 mm to about 4000 mm, such as from about 2000 mm to about 4000 mm, such as from about 3000 mm to about 4000 mm, such as from about 20 mm to about 3000 mm, such as from about 50 mm to about 3000 mm, such as from about 100 mm to about 3000 mm, such as from about 500 mm to about 3000 mm, such as from about 1000 mm to about 3000 mm, such as from about 2000 mm to about 3000 mm, such as from about 2000 mm to about 2500 mm, and all ranges and subranges therebetween.

The glass ribbon 101 can comprise a variety of compositions including but not limited to soda-lime glass, borosilicate glass, alumino-borosilicate glass, an alkali-containing glass, or an alkali-free glass. In some embodiments, the glass ribbon 101 can comprise a coefficient of thermal expansion of ≤15 ppm/° C., ≤10 ppm/° C., or ≤5 ppm/° C., for example, from about 5 ppm/° C. to about 15 ppm/° C., such as from about 5 ppm/° C. to about 10 ppm/° C., and all ranges and subranges therebetween. In some embodiments, the glass ribbon 101 can include a speed as it traverses along travel direction 125 of ≥50 mm/s, ≥100 mm/s, or ≥500 mm/s, for example, from about 50 mm/s to about 500 mm/s, such as from about 100 mm/s to about 500 mm/s, and all ranges and subranges therebetween.

Figure 2:
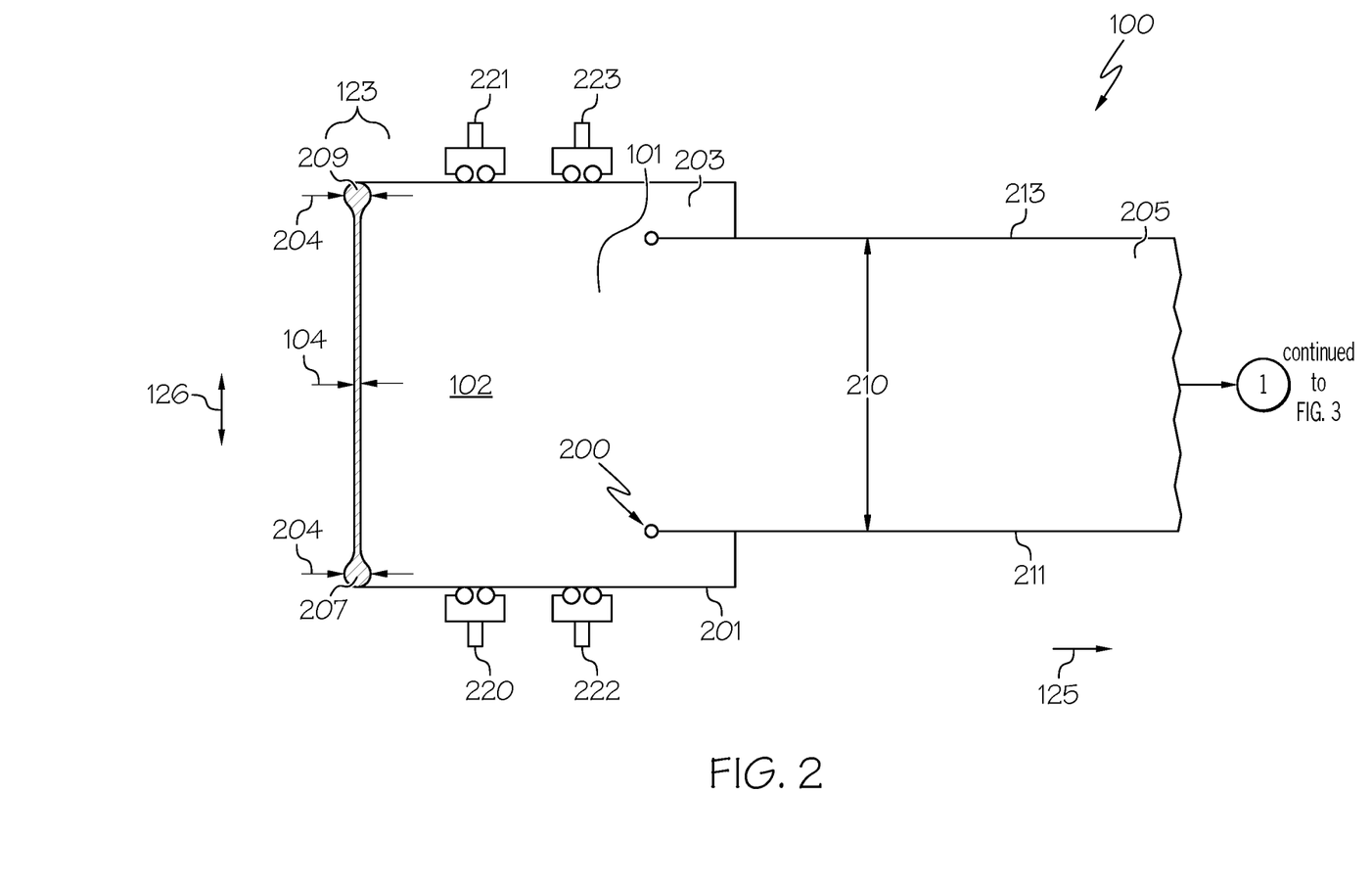
FIG. 2 schematically illustrates a top view of the exemplary glass manufacturing apparatus along line 2-2 of FIG. 1.

As shown by the view of FIG. 2, the glass ribbon 101 can include a pair of opposed edge portions 201, 203 and a central portion 205 spanning between the opposed edge portions 201, 203. The edge portions 201, 203 of the glass ribbon 101 may have corresponding edge beads 207, 209 with a bead thickness 204 that can be greater than a thickness 104 of the central portion 205 of the glass ribbon 101. In some embodiments, the glass ribbon 101 of the coiled spool 106 may or may not include the edge beads 207, 209. In other embodiments, it may be desirable to process the glass ribbon 101 without removing the edge beads 207, 209. In still other embodiments, it may be desirable to remove the edge beads 207, 209 from the glass ribbon 101 prior to subsequent processing of the glass ribbon 101. Accordingly, as schematically illustrated in FIG. 1, the edge separation apparatus 200 may be optionally employed to remove the edge beads 207, 209 or other edge imperfections from the glass ribbon 101. The edge separation apparatus 200 may also be used to separate the edge portions 201, 203 from the glass ribbon 101 for further processing of the central portion 205 and/or the edge portions 201, 203. For instance, in some embodiments, the edge portions 201, 203 may be used in other applications depending on the process parameters. While the description herein may infer that the edge separation apparatus 200 may separate edge portions 201, 203 of the glass ribbon 101 in a horizontal fashion, the claims should not be so limited, as it is envisioned that the edge portions 201, 203 can be separated from the glass ribbon 101 in a vertical fashion (i.e., "on the draw") as well.

Additional embodiments of the glass processing apparatus 100 can include lateral guides 220, 221, 222, 223 to help orient the glass ribbon 101 in a lateral position (e.g., crosswise direction 126) transverse to the travel direction 125 of the glass ribbon 101. In one embodiment, as schematically shown in FIG. 2, the lateral guides 220, 221, 222, 223 can each include rollers configured to engage a corresponding one of the opposed edge portions 201, 203. Corresponding forces applied to the edge portions 201, 203 by the corresponding lateral guides 220, 221, 222, 223 can shift and align the glass ribbon 101 in a lateral orientation along the crosswise direction 126 transverse to the travel direction 125 of the glass ribbon 101. The edge separation apparatus 200 can separate the edge portions 201, 203 from the glass ribbon 101 using a laser scoring process or other cutting, severing, or separation process to produce the central portion 205 that includes a width (e.g., an entire width 210 between a first outer edge 211 and a second outer edge 213).

Figure 3:
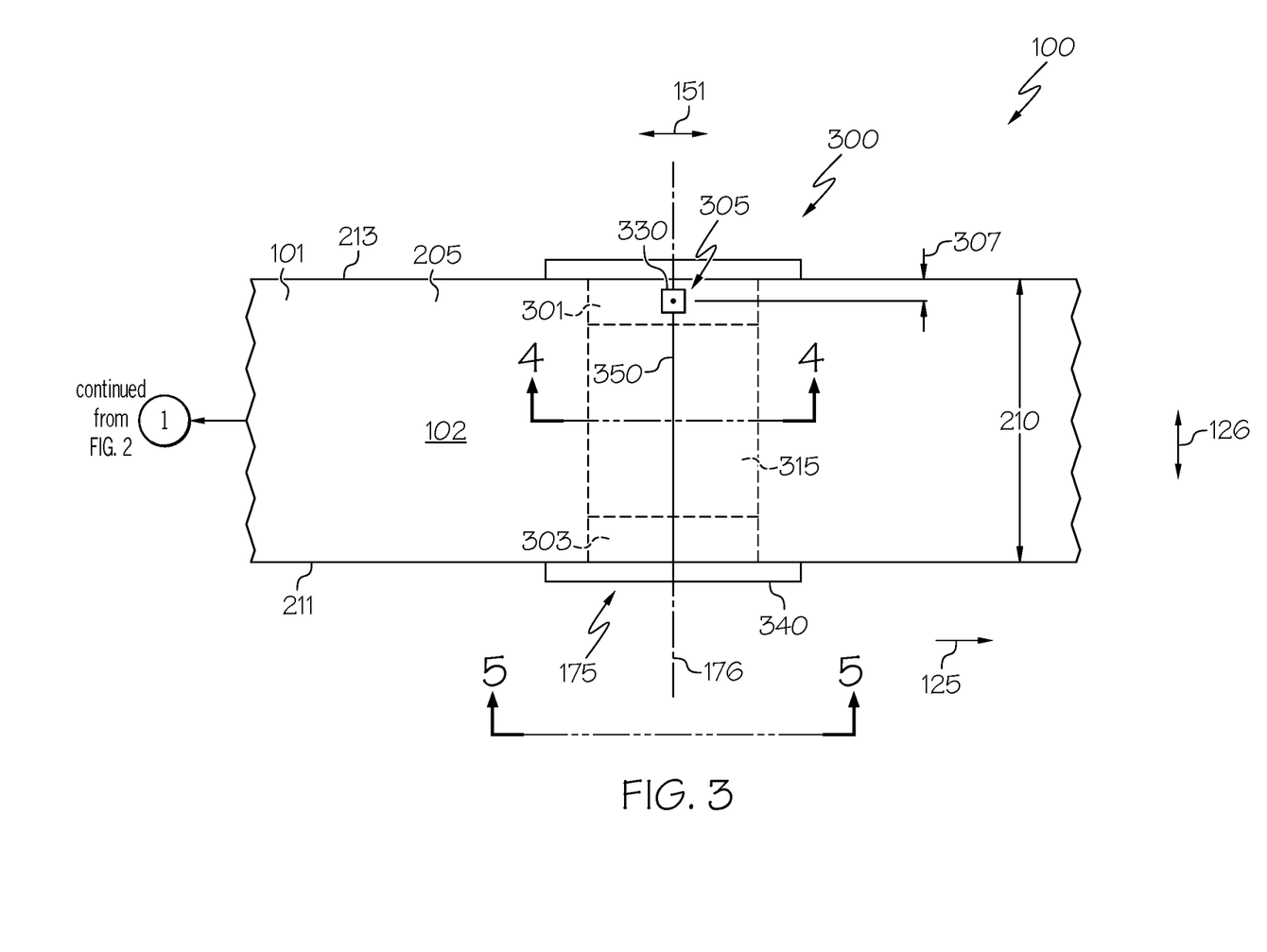
FIG. 3 schematically illustrates a top view of the exemplary glass manufacturing apparatus along line 3-3 of FIG. 1.

As will be discussed more fully herein, a separation apparatus 300 can also be provided for severing the glass ribbon 101, such as the central portion 205 of the glass ribbon 101 (e.g., in embodiments where edge portions 201, 203 have been removed). As illustrated in FIG. 3, the separation apparatus 300 can include a bending support member 340 that imparts a curvature 175 in the glass ribbon 101. The separation apparatus 300 can also include a defect tool 330 that applies a defect 305 to the glass ribbon 101. The separation apparatus 300 can be configured to separate or sever a glass sheet 190 from the glass ribbon 101, to sever the glass ribbon 101 or the glass sheet 190 to a desired length, to remove an unwanted or undesirable segment of the glass ribbon 101 from the source 105 of glass ribbon 101, and/or to facilitate switching between a first coiled spool 106 including a desired length of glass ribbon 101 wound onto the core 108 of the coiled spool 106 and a new core 108 to begin receiving glass ribbon 101 to coil the glass ribbon 101 onto the new core 108 to form another coiled spool 106. Separation of the glass ribbon with the separation apparatus 300, for instance as discussed above, can be achieved with minimal, if any, disruption while traversing the glass ribbon 101 in the travel direction 125 from the source 105 of the glass ribbon 101.

In other embodiments, as schematically illustrated in FIG. 1, the separation apparatus 300 can separate the glass ribbon 101 to produce a plurality of individual glass sheets 190 that can be stacked together in a stack 191, optionally, with interleaf paper 192 between adjacent glass sheets 190 to permit subsequent packaging, shipping, transporting, or storing of the stack 191 or one or more of the plurality of individual glass sheets 190. In addition or alternatively, the separation apparatus 300 can separate the glass ribbon 101 to produce a plurality of rolled glass sheets 194, each of which can be consecutively rolled onto a first coiled spool 193. The plurality of rolled glass sheets 194 can include a backing 195 that may serve as an interleaf layer to protect adjacent layers of rolled glass sheets 194 on the first coiled spool 193. The backing 195 can also act as a web that connects consecutive rolled glass sheets 194 cut from the glass ribbon 101 to permit continuous winding of the rolled glass sheets 194 onto the first coiled spool 193 by rolling the rolled glass sheets 194 and the corresponding backing 195 together onto the first coiled spool 193. The backing 195 can be applied to the glass ribbon 101 prior to separating the glass ribbon 101, while separating the glass ribbon 101, or after separating the glass ribbon 101. In the case where the backing 195 is applied to the glass ribbon 101 prior to separating the glass ribbon 101, the glass ribbon 101 can be separated without damaging (e.g., without tearing, breaking, or cutting) the backing 195 between adjacent rolled glass sheets 194. Accordingly, a glass ribbon 101 including a backing 195 can be separated into a plurality of individual glass sheets 194 that remain secured to the backing 195 to be conveniently rolled into the coiled spool 193 of glass sheets for storage and/or transport. In other embodiments, as the glass sheets 194 are separated from the glass ribbon 101, the glass sheets 194 can be secured to the backing 195 either simultaneously with or subsequent to the separation process. In another embodiment, the separation apparatus 300 can separate the glass ribbon 101 to produce a second coiled spool 196 of separated rolled glass ribbon 197 including a desired length of separated rolled glass ribbon 197 that has been separated from the glass ribbon 101. The separated rolled glass ribbon 197 can include an interleaf layer 198, spacer, or other protective barrier between adjacent layers of the separated rolled glass ribbon 197.

Figure 4:
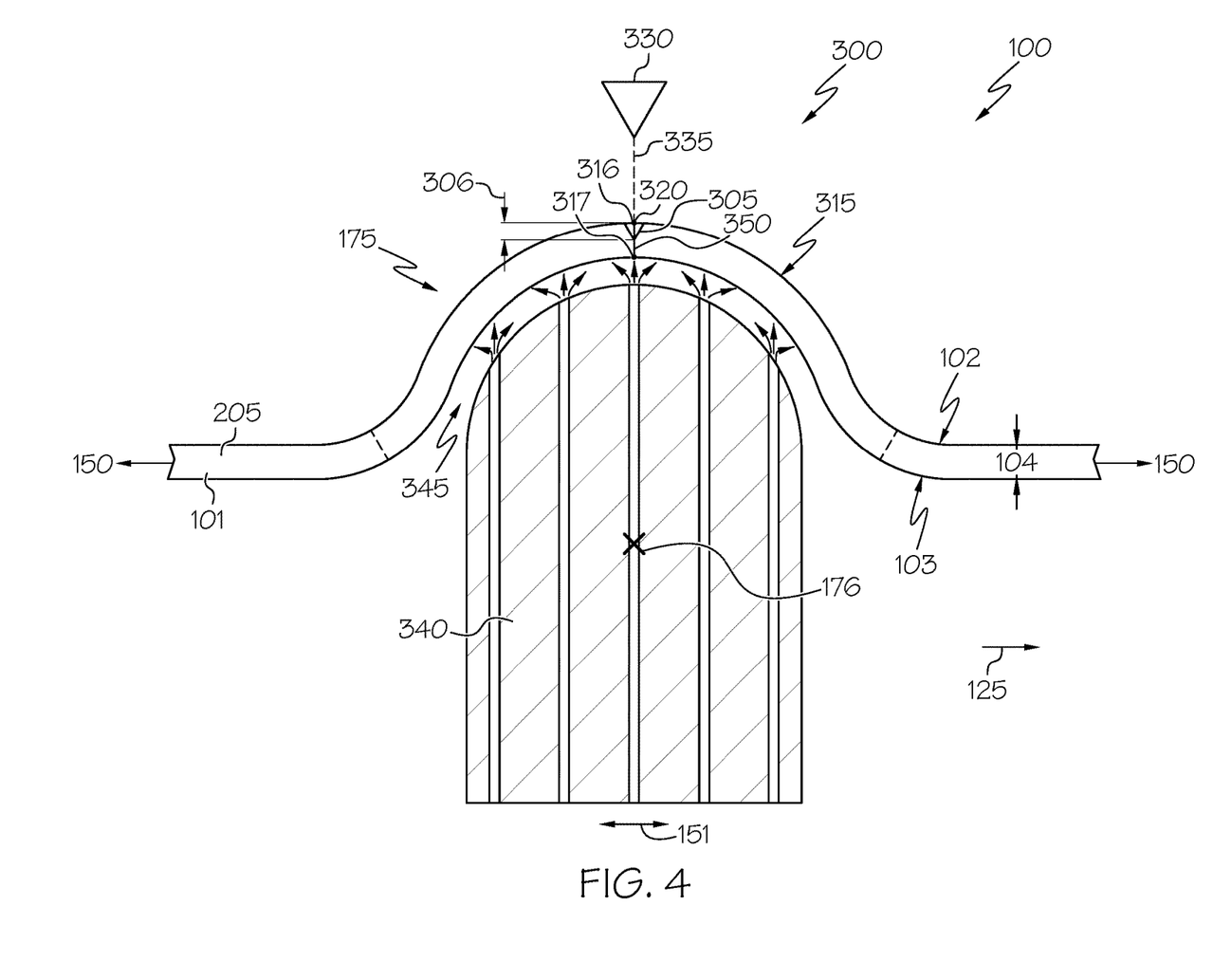
FIG. 4 schematically illustrates a cross-section view of the exemplary glass manufacturing apparatus along line 4-4 of FIG. 3.

With reference to FIG. 3 and FIG. 4, a method of separating the glass ribbon 101 can include the step of placing the glass ribbon 101 in tension by applying an in-plane tension 150 (see FIG. 4) to the glass ribbon 101 in a tensile direction 151 (See FIG. 3). The in-plane tension 150 can be applied in any manner to the glass ribbon 101, including, but not limited to, in-plane tension 150 produced based on a weight of the glass ribbon 101 as a result of gravity acting on the glass ribbon 101 when at least a section of the glass ribbon 101 is at an elevation higher than another section of the glass ribbon 101. In some embodiments, components of the glass processing apparatus 100 can apply the in-plane tension 150 to the glass ribbon 101. In one embodiment, the sources 105 of the glass ribbon 101 may apply an in-plane tension 150 to the glass ribbon 101 by imparting a force in a direction opposite the travel direction 125 that opposes the traversal of the glass ribbon 101. Forces in the direction opposite the travel direction 125 can counteract or resist the motion of the glass ribbon 101 thus producing the in-plane tension 150 in the glass ribbon 101. Other apparatus and methods, including, but not limited to, idle rollers, driven rollers, and pinch rollers arranged at any location within the glass processing apparatus 100 (e.g., at least one of upstream and downstream from the separation apparatus 300) may be used to apply the in-plane tension 150 to the glass ribbon 101. For example, in-plane tension 150 may occur as a result of pulling the glass ribbon at a location downstream from the separation apparatus 300 to help drive the glass ribbon in the travel direction 125. In some embodiments, resistance to such pulling of the glass ribbon (e.g., friction, upstream breaking, process speed limitations, etc.) may consequently result in the in-plane tension 150.

It is to be understood that the in-plane tension 150 (e.g., at least a component of the in-plane tension 150) in the glass ribbon 101 may follow a path or curvature 175 of the glass ribbon 101 and need not be limited to instances where the glass ribbon 101 and the in-plane tension 150 are coplanar. Indeed, the in-plane tension 150 may be considered as a tensile force applied to or caused within the glass ribbon 101 that, with respect to a lateral cross section of the glass ribbon 101, produces equal and opposite forces both of which are normal to a plane of that cross section. As such, the tensile direction 151 can be determined at each point of the portion of the glass ribbon 101 that has an in-plane tension and can be considered equal and opposite forces that are both normal to a plane of a cross section perpendicular to the major surfaces of the glass ribbon at that point. Furthermore, with respect to curved portions of the glass ribbon under in-plane tension, the tensile direction 151 can also be determined at each point of the curved portion of the glass ribbon 101 that is in tension and can be considered equal and opposite forces that are both tangent to the curvature at that point of the curved portion of the glass ribbon.

Figure 5:
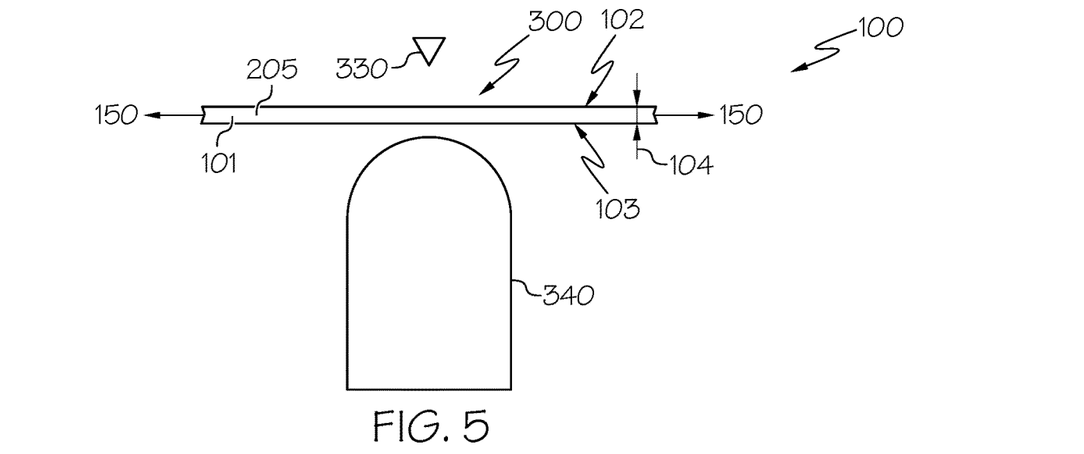
FIG. 5 schematically illustrates a side view of one embodiment of the exemplary glass manufacturing apparatus along line 5-5 of FIG. 3.
Figure 6:
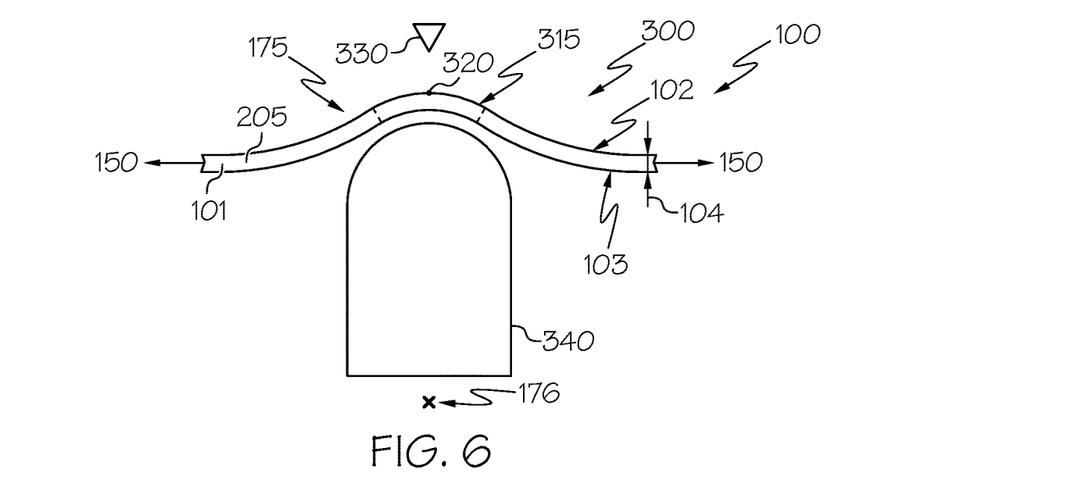
FIG. 6 schematically illustrates a side view of another embodiment of the exemplary glass manufacturing apparatus along line 5-5 of FIG. 3.
Figure 7:
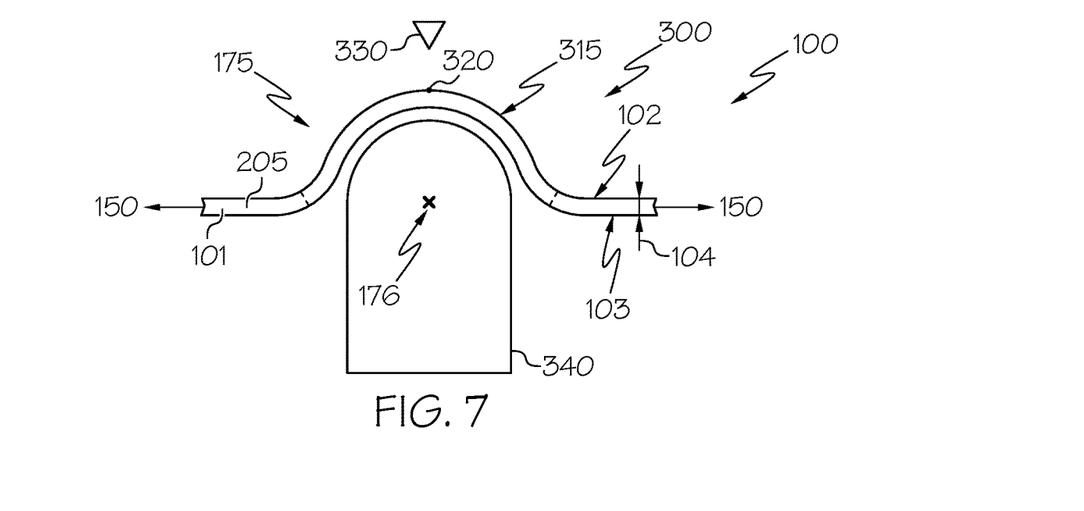
FIG. 7 schematically illustrates a side view of still another embodiment of the exemplary glass manufacturing apparatus along line 5-5 of FIG. 3.

As illustrated in each of FIGS. 5-7, the in-plane tension 150 may act on the glass ribbon 101 when the glass ribbon 101 is planar (e.g., as illustrated in FIG. 5, where no curvature 175 is imparted on the glass ribbon 101), when a curvature 175 (e.g., a relatively less pronounced curvature 175, illustrated in FIG. 6) is imparted on the glass ribbon 101, and when a curvature 175 (e.g., a relatively large pronounced curvature 175, illustrated in FIG. 7) is imparted on the glass ribbon 101. In each embodiment, as well as those embodiments neither illustrated nor explicitly disclosed herein, the in-plane tension 150 can act on the glass ribbon 101 in the tensile direction 151 to produce a corresponding in-plane tensile stress within the glass ribbon 101.

The method can further include the step of producing a region 315 of increased tension on a first major surface 102 of the glass ribbon 101 by imparting the curvature 175 in the glass ribbon 101. The region 315 of increased tension can include in-plane tensile force or forces and corresponding in-plane tensile stress or stresses resulting from the in-plane tension 150 described above. In addition, the region 315 of increased tension can also include bending tensile force or forces and corresponding bending tensile stress or stresses from the imparted curvature 175. Accordingly, the region 315 of increased tension can be defined as a location on the first major surface 102 of the glass ribbon 101 where bending tensile stress produced as a result of the imparted curvature 175 combines with in-plane tensile stress from the applied in-plane tension 150 to produce a net tensile stress in the region 315 of increased tension on the first major surface 102 of the glass ribbon 101 that includes a magnitude greater than either of the individual bending tensile stress produced as a result of the imparted curvature 175 and the individual in-plane tensile stress from the applied in-plane tension 150.

The region 315 of increased tension therefore includes at least two additive components of tensile stress (e.g., tensile stress from the applied in-plane tension 150 and bending tensile stress from the imparted curvature 175) that act together to place or maintain the region 315 of increased tension on the first major surface 102 in tension. It is to be understood that while the region 315 of increased tension may be described herein with respect to the first major surface 102; in other embodiments, the region 315 of increased tension can be produced on either the first major surface 102 or the second major surface 103 based at least in part on whether the first major surface 102 or the second major surface 103 is placed in tension or compression as a result of a corresponding convex or concave profile due to the imparted curvature 175.

In addition, the curvature 175 can be imparted in any manner, including, but not limited to, imparting the curvature 175 with the bending support member 340. In some embodiments (not illustrated), the bending support member 340 can include rollers or other mechanical devices or solid objects that contact (e.g., mechanically contact) the glass ribbon 101 to impart the curvature 175 in the glass ribbon 101. In yet another embodiment, the curvature 175 can be imparted in the glass ribbon 101 without contacting the glass ribbon 101 with a solid object. In one embodiment, the curvature 175 can be imparted with a cushion of air 345 (See FIG. 4). The bending support member 340 can include a non-contact bending support member 340 that supports the glass ribbon 101 without touching either of the first major surface 102 or the second major surface 103 of the central portion 205 of the glass ribbon 101. In some embodiments, the bending support member 340 can include one or more curved air bars that provide the cushion of air 345 to support the glass ribbon 101 at a spaced proximity to the bending support member 340 without contacting (e.g., mechanically contacting) the bending support member 340.

With further reference to FIG. 4, the bending support member 340 can be provided with a plurality of passages that provide positive pressure ports such that an air stream can be forced through the positive pressure ports toward the glass ribbon 101 to create the cushion of air 345 for a noncontact support of the glass ribbon 101. Optionally, the plurality of passages can include negative pressure ports such that an air stream can be drawn away from the glass ribbon 101 to create a suction to partially counteract the force from the cushion of air 345 created by the positive pressure ports. A combination of positive and negative pressure ports can help stabilize the glass ribbon 101 throughout the separation process. Indeed, the positive pressure ports can help maintain a desired spacing between the bending support member 340 and the glass ribbon 101 with the cushion of air 345. At the same time, the negative pressure ports can help pull the central portion 205 of the glass ribbon 101 toward the bending support member 340 to prevent the glass ribbon 101 from undulating and/or to prevent portions of the glass ribbon 101 from floating away when traversing over the bending support member 340 in the travel direction 125. Providing support with corresponding cushions of air 345 can help position the glass ribbon 101 for separating without touching the pristine major surfaces 102, 103 of the glass ribbon 101. As such, scratching or other damage to the pristine major surfaces 102, 103 of the glass ribbon 101 can be avoided. Moreover, the bending support member 340 can include an air bar having a curved or contoured shape to impart a corresponding curved or contoured shape (e.g., curvature 175) into the glass ribbon 101.

Control or adjustment of a position (e.g., height) of the bending support member 340 with respect to the glass ribbon 101 can correspondingly control or adjust an amount (e.g., height or radius) of the curvature 175. As illustrated in each of FIGS. 5-7, the bending support member 340 can be positioned to impart no curvature on the glass ribbon 101 (e.g., as illustrated in FIG. 5, where the glass ribbon 101 is planar). The bending support member 340 can also be positioned to impart a relatively less pronounced curvature 175 (e.g., illustrated in FIG. 6) as well as a relatively large pronounced curvature 175 (e.g., illustrated in FIG. 7) on the glass ribbon 101. In each embodiment, as well as those embodiments neither illustrated nor explicitly disclosed herein, the bending support member 340 can impart any amount of curvature 175 on the glass ribbon 101 to produce a corresponding bending stress within the glass ribbon 101.

It is to be understood that the curvature 175 of the glass ribbon 101 can be based on at least one of a dimension (e.g., diameter or radius) of the bending support member 340, a height of the glass ribbon 101 (e.g., an elevation of an apex 320 of the curvature 175) relative to other sections of the glass ribbon 101 on which gravity acts to affect the curvature 175 of the glass ribbon 101, a thickness (e.g., thickness 104) of the glass ribbon 101, a stiffness of the glass ribbon 101, the applied in-plane tension 150 in the glass ribbon 101, as well as other factors, variables, and characteristics. Thus, as illustrated in FIG. 6, the curvature 175 of the glass ribbon 101 may not adopt an identical contour or profile of the bending support member 340 such that a radius of the curvature 175 defined with respect to an axis 176 of the curvature 175 may vary at different locations along the curvature 175. However, as illustrated in FIG. 7, the curvature 175 of the glass ribbon 101 may adopt an identical contour or profile of the bending support member 340 such that a radius of the curvature 175 defined with respect to an axis 176 of the curvature 175 can be uniform at different locations relative to the curvature 175.

The method can further include separating the glass ribbon 101 along a separation path 350 parallel to the axis 176 of the curvature 175 and transverse to the tensile direction 151. Referring to FIG. 3, in some embodiments, the separation path 350 may be in the direction of the width 210 of the glass ribbon 101. In some embodiments, separation along the separation path 350 may be achieved by applying a defect 305 to a portion 301, 303 of the first major surface 102 in the region 315 of increased tension. The separation path 350 can be defined as an axis oriented through the glass ribbon 101 or a corresponding plane extending long a thickness of the glass ribbon and intersecting an axis oriented through the glass ribbon 101 between the outer edges 211, 213 of the glass ribbon 101. In some embodiments, the separation path 350 can be defined as a plane that intersects each of the first major surface 102 and the second major surface 103 at a right angle. As illustrated in FIG. 3, the defect 305 can be applied to the portion 301 of the first major surface 102, which can be adjacent to outer edge 213 of the glass ribbon 101; however, in other embodiments, the defect 305 can be applied to the portion 303 of the first major surface 102, which can be adjacent to outer edge 211 of the glass ribbon 101. In some embodiments, the defect 305 can be a point defect, a line defect, an abrasion, a nick, a cut, a scratch, a groove, a notch, a score, or any other desired or intentional flaw or imperfection applied to the portion 301, 303 of the first major surface 102 in the region 315 of increased tension.

As such, the glass ribbon 101 can spontaneously separate along the separation path 350 in response to the defect 305. In other words, the defect 305 can initiate a crack which then automatically propagates along the separation path 350 from the defect 305 in a direction away from the defect 305 due to the tensile stress within the region 315, and separates the glass ribbon 101 (e.g., causes the glass ribbon 101 to fracture or fail) along the separation path 350. A primary mode of fracture of the crack can be an opening mode (e.g., Mode I) which occurs when a material, unable to resist a prescribed tensile stress applied in a direction parallel to the major surface of the material, opens (e.g., fractures) along a fracture plane that is perpendicular to the major surface of the material to form the crack or crack propagation through the thickness of the material along the fracture plane. The applied in-plane tension 150 and the tensile stress produced in the region 315 of increased tension can act together (e.g., in combination) as an opening force at the separation path 350 that propagates the crack through the glass ribbon 101 along the separation path 350 upon application of the defect 305 which initiates the crack. In some embodiments, the tensile stress produced in the region 315 of increased tension resulting from the imparted curvature 175 can be beneficial to maintain a straight in-plane fracture.

The crack may propagate immediately and rapidly such that the glass sheet 190 can be separated from the glass ribbon 101 instantaneously (e.g., almost instantaneously), i.e., over a negligible time period. The separation of the glass ribbon 101 can occur as a natural propagation of a crack, producing corresponding separated edges and separated surfaces at the separation path 350 on both the individual glass sheet 190 as well as the glass ribbon 101 that can be partially, substantially, or entirely straight or planar, partially, substantially, or entirely pristine and free of flaws or other imperfections, as well as partially, substantially, or entirely free of debris or glass particles that may otherwise contaminate the separation process when a mechanical cut or score line is applied to the glass ribbon 101 to facilitate a mechanical severing or other severing of the glass ribbon 101 along the score line, as is known in the prior art.

Moreover, the defect 305 of the present disclosure is to be understood to be distinguished from a score line of the prior art that extends across greater than half or even an entire width 210 of the glass ribbon 101 to define or create a physical path (e.g., score line) in the glass ribbon 101 along which the glass ribbon 101 separates. In some examples of the prior art, a score line is typically applied across the entire quality (e.g., pristine) surface of the glass ribbon 101. Unlike typical score lines of the prior art, embodiments of the disclosure provide the defect 305 that is small enough such that it is not required to extend across a quality (e.g., pristine) surface of the glass ribbon 101. Indeed, some embodiments may provide the defect that is small enough to only extend within nonquality edge areas of the glass ribbon (e.g., within 25 mm from the outer edge of the glass ribbon). Indeed, the defect 305 of the present disclosure comprises a relatively small defect when compared to the entire width of the glass ribbon. Some embodiments of defects of the disclosure can comprise a line defect, an abrasion, a nick, a cut, a scratch, a groove, a notch, a score, or any other desired or intentional flaw or imperfection having a maximum dimension of greater than 0 mm and less than 25 mm, such as greater than 0 mm and less than, 20 mm, such as greater than 0 mm and less than 10 mm, such as greater than 0 mm and less than 5 mm, such as greater than 0 mm and less than 1 mm. In some embodiments, the defect comprises a point defect with a dimension of greater than 0 mm and less than 1 mm, such as greater than 0 mm and less than 0.5 mm, such as greater than 0 mm and less than 0.3 mm. Accordingly, with respect to some embodiments, the method of the present disclosure is to be understood to separate the glass ribbon 101 along a separation path 350 in response to application of the defect 305 without applying a score line to the glass ribbon 101.

The defect 305 can be applied to the portion 301, 303 of the first major surface 102 in the region 315 of increased tension within a distance 307 from an outer edge 211, 213 of the glass ribbon 101. Based on experimental results and theoretical analysis, a distance 307 of greater than zero and less than or equal to about 25 mm from an outer edge 211, 213 has been determined to provide a clean separation of the glass ribbon 101 along the separation path 350 that results in partially, substantially or entirely straight (e.g., planar) severed edges along the separation path 350. In some embodiments where the edge beads 207, 209 have been removed, if the defect 305 is applied directly to the outer edge 211, 213 (e.g., at a distance 307 equal to zero) of the glass ribbon 101, the glass ribbon 101 may experience uncontrolled or undesirable breaking, cracking, or chipping based at least in part on a decreased strength of the outer edge 211, 213 as compared to an increased strength of the glass ribbon 101 in the central portion 205 of the glass ribbon 101. Conversely, in some embodiments, if the defect 305 is applied to the central portion 205 of the glass ribbon 101 at a distance 307 greater than 25 mm, the defect 305 may create an imperfection on a pristine surface of the glass ribbon 101 that may subsequently render the glass sheet 190 unusable for a particular display application. In addition, if the defect 305 is applied to the central portion 205 of the glass ribbon 101 at a distance 307 greater than 25 mm, the crack that propagates as a result of the defect 305 may be unable to propagate to the outer edges 211, 213 of the glass ribbon 101 and the glass ribbon 101 may not fully separate along the separation path 350. In some embodiments, the portion 301, 303 to which the defect 305 can be applied may be used for subsequent transport or handling of the glass sheet 190 or may be sufficiently external to the central portion 205 of the glass ribbon 101 such that the portion 301, 303 may not interfere with product applications in which the glass sheet 190 may be employed, such as, for example, display applications. Thus, in some embodiments, the glass ribbon 101 can be separated in a non-contact manner without touching or contacting pristine surfaces (e.g., surfaces within a quality area of the glass ribbon 101 as defined by an end user or end process) of the central portion 205 of the glass ribbon 101 with a solid object.

In yet another embodiment, with reference to FIG. 4, the defect 305 can include a depth 306 from the first major surface 102. Based on experimental results and theoretical analysis, it was determined that the depth 306 of the defect can provide beneficial results within a range of about 25% to 100%, such as about 25% to about 75% of a thickness 104 of the glass ribbon 101. Furthermore, based on experimental results and theoretical analysis, it was determined that, in some embodiments, a defect 305 with a depth 306 of less than about 25% of the thickness 104 of the glass ribbon 101 was insufficient to initiate propagation of the crack, in which case the glass ribbon 101 did not separate or separated in a delayed or otherwise unacceptable manner. In other embodiments, based on experimental results and theoretical analysis, it was determined that a defect 305 with a depth 306 greater than about 75% of the thickness 104 of the glass ribbon 101 provided excessive and unstable energy or stress resulting in undesirable imperfections (e.g., small cracks, chips, etc.) at the site of application of the defect 305 that resulted in a flawed edge along the separation path 350. In further examples, based on experimental results, in some cases, the defect 305 with a depth 306 of 100% of the thickness 104 of the glass ribbon 101 provided desirable results.

In some embodiments the defect 305 can be applied to the portion 301, 303 of the first major surface 102 in the region 315 of increased tension while the in-plane tension 150 is applied to the glass ribbon 101 and while the curvature 175 is imparted in the glass ribbon 101. In other embodiments, the method can further include the step of continuously conveying the glass ribbon 101 in a travel direction 125 coincident with the tensile direction 151 while applying the in-plane tension 150, while imparting the curvature 175, and while applying the defect 305. The method of separating the glass ribbon 101 of the present disclosure can therefore separate a continuously moving glass ribbon 101. In still other embodiments, the method of separating the glass ribbon 101 of the present disclosure can also be employed in a non-continuous or static (e.g., offline) process to separate a freestanding, static glass ribbon or a freestanding, static glass sheet.

One embodiment of applying the defect 305 with the defect tool 330 can include using a scribe (e.g., tip, blade, point, rotary disk, etc.) or other solid object or mechanical device to mechanically contact the first major surface 102 of the glass ribbon 101 to create the defect 305. The defect 305 can be applied as a controlled surface defect at an initial site or location on the glass ribbon 101 where the glass ribbon 101 is to be separated. In yet another embodiment, the defect 305 can be applied to the portion 301, 303 of the first major surface 102 in the region 315 of increased tension without contacting the glass ribbon 101 with a solid object. In one embodiment, the defect 305 can be applied with the defect tool 330 including a laser, such as an ultraviolet laser, that produces a laser beam 335 configured to impinge the first major surface 102 of the glass ribbon 101 and apply the defect 305.

Turning to FIG. 4 and FIGS. 5-7, various embodiments of the glass ribbon 101 and the separation apparatus 300 are illustrated. As noted, the region 315 of increased tension can include a tensile bending stress from the imparted curvature 175 and an in-plane tensile stress from the applied in-plane tension 150. In one embodiment, at an apex 320 of the curvature 175 within the region 315 of increased tension, the first major surface 102 can include a first axis 316 of maximum tensile stress parallel to an axis 176 of the curvature 175. In another embodiment, the first axis 316 of maximum tensile stress can include tensile stress within a range from about 15 MPa to about 30 MPa. The range from about 15 MPa to about 30 MPa can include any combination (e.g., summation) of tensile stress from the applied in-plane tension 150 and bending tensile stress from the imparted curvature 175. Based on experimental results and theoretical analysis, it was determined that, in some embodiments, a stress of less than 15 MPa along the first axis 316 of maximum tensile stress was insufficient to open or propagate the crack. In other embodiments, based on experimental results and theoretical analysis, it was determined that a stress of greater than 30 MPa along the first axis 316 of maximum tensile stress resulted in an uncontrolled propagation of the glass ribbon 101 along the separation path 350 and produced spidering or uncontrolled fracture of the glass ribbon 101 along and adjacent to the separation path 350. In still another embodiment, the first axis 316 of maximum tensile stress can be coincident with the separation path 350. In one embodiment, the defect 305 can be applied to the portion 301, 303 of the first major surface 102 at a location on the first axis 316 of maximum tensile stress. In another embodiment, the curvature 175 can be imparted across an entire width 210 of the glass ribbon 101, and the first axis 316 of maximum tensile stress can extend along the entire width 210. In still another embodiment, the first axis 316 of maximum tensile stress can include a partially, substantially, or entirely uniform stress across the entire width 210 of the glass ribbon 101.

In still another embodiment, opposite the apex 320 of the curvature 175, the second major surface 103 of the glass ribbon 101 can include a second axis 317 of stress parallel to the axis 176 of the curvature 175, wherein tensile stress along the first axis 316 of maximum tensile stress is greater than tensile stress along the second axis 317 of stress. The tensile stress along the first axis 316 on the first major surface 102 can include a combination (e.g., summation) of stresses including the tensile stress produced by the in-plane tension 150 and the tensile bending stress from the convex profile of the imparted curvature 175. The tensile stress along the second axis 317 on the second major surface 103 can include a combination (e.g., summation) of stresses including the tensile stress produced by the in-plane tension 150 and a compressive bending stress from the concave profile of the imparted curvature 175. The net stress along the second axis 317 on the second major surface 103 can therefore be a tensile stress in cases where a magnitude of the compressive bending stress along the second axis 317 from the concave profile of the imparted curvature 175 is less than a magnitude of the tensile stress along the second axis 317 produced by the in-plane tension 150.

In yet another embodiment, opposite the apex 320 of the curvature 175, the second major surface 103 of the glass ribbon 101 can include compressive stress along the second axis 317 parallel to the axis 176 of the curvature 175. As noted, the tensile stress along the first axis 316 on the first major surface 102 can include a combination (e.g., summation) of stresses including the tensile stress produced by the in-plane tension 150 and the tensile bending stress from the convex profile of the imparted curvature 175. The tensile stress along the second axis 317 on the second major surface 103 can include a combination (e.g., summation) of stresses including the tensile stress produced by the in-plane tension 150 and a compressive bending stress from the concave profile of the imparted curvature 175. The net stress along the second axis 317 on the second major surface 103 can therefore be a compressive stress in cases where a magnitude of the compressive bending stress along the second axis 317 from the concave profile of the imparted curvature 175 is greater than a magnitude of the tensile stress along the second axis 317 produced by the in-plane tension 150.

In the embodiments discussed above, the in-plane tension 150 can facilitate spontaneous separation of the glass ribbon upon application of the defect 305 to the first major surface 102 of the glass ribbon 101. Indeed, the in-plane tension 150 will reduce the compressive bending stress from the concave profile of the imparted curvature 175 along the second axis 317 and may even produce tension along the second axis 317 in some embodiments. As such, excessive compressive stress of the second major surface 103 along the separation path can be reduced or even eliminated, thus enhancing the ability of the crack generated from the defect to spontaneously form a full body crack through both the first major surface 102 and the second major surface 103 to promote spontaneous separation of the glass ribbon 101. Furthermore, the defect 305 may be provided on the first axis 316 of maximum stress, wherein the glass ribbon will spontaneously separate along the first axis 316 since the full body crack will quickly propagate along the axis of maximum stress extending along the separation path.

As indicated above, in various embodiments there are provided methods and apparatus for separating a glass ribbon 101 to produce a glass sheet 190. Manufacturers of glass sheets (e.g., for use in liquid crystal displays "LCDs," electrophoretic displays "EPD," organic light emitting diode displays "OLEDs," plasma display panels "PDPs") often heat treat and/or chemically strengthen the glass sheets to improve or modify their properties. As may be appreciated, a glass sheet according to various embodiments may include one or more edges. A glass sheet may be provided that has four edges and a generally square, rectangular, trapezoidal, parallelogram or other shape. Glass sheets of various sizes, including varying lengths, heights, and thicknesses, are also contemplated within the scope of the disclosure.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Likewise, a "plurality" is intended to denote "more than one."

Ranges can be expressed herein as from "about" one particular value, and/or to "about" another particular value. When such a range is expressed, embodiments include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, implied alternative embodiments to an apparatus that comprises A+B+C include embodiments where an apparatus consists of A+B+C and embodiments where an apparatus consists essentially of A+B+C.

It will be apparent to those skilled in the art that various modifications and variations can be made to the present disclosure without departing from the spirit and scope of the appended claims. Thus, it is intended that the present disclosure cover the modifications and variations of the embodiments herein provided they come within the scope of the appended claims and their equivalents.

What is claimed is:

1. A method of separating a glass web comprising the steps of:
    placing the glass web in tension by applying an in-plane tension to the glass web in a tensile direction;
    producing a region of increased tension on a first major surface of the glass web by imparting a curvature in the glass web; and
    separating the glass web along a separation path parallel to an axis of the curvature and transverse to the tensile direction by applying a defect to a portion of the first major surface in the region of increased tension.

2. The method of claim 1, wherein the glass web comprises a thickness within a range of from about 50 μm to about 500 μm.

3. The method of claim 1, wherein the glass web separates along the separation path in response to the application of the defect.

4. The method of claim 1, wherein the separating comprises applying the defect to the portion of the first major surface in the region of increased tension while the in-plane tension is applied to the glass web and while the curvature is imparted in the glass web.

5. The method of claim 1, wherein the defect is applied to the portion of the first major surface in the region of increased tension within a distance of greater than zero and less than or equal to about 25 mm from an outer edge of the glass web.

6. The method of claim 1, wherein the defect comprises a depth from the first major surface of from about 25% to about 100% of a thickness of the glass web.

7. The method of claim 1, wherein the separating comprises applying the defect to the portion of the first major surface in the region of increased tension without contacting the glass web with a solid object.

8. The method of claim 1, wherein the producing a region of increased tension comprises imparting the curvature in the glass web without contacting the glass web with a solid object.

9. The method of claim 8, wherein the producing a region of increased tension comprises imparting the curvature with a cushion of air.

10. The method of claim 1, further comprising the step of continuously conveying the glass web in a travel direction coincident with the tensile direction while applying the in-plane tension, while imparting the curvature, and while applying the defect.

11. The method of claim 1, wherein the region of increased tension comprises a tensile bending stress from the imparted curvature and an in-plane tensile stress from the applied in-plane tension.

12. The method of claim 1, wherein, at an apex of the curvature within the region of increased tension, the first major surface comprises an axis of maximum tensile stress parallel to the axis of the curvature.

13. The method of claim 12, wherein the axis of maximum tensile stress comprises tensile stress within a range from about 15 MPa to about 30 MPa.

14. The method of claim 12, wherein, opposite the apex of the curvature, a second major surface of the glass web comprises a second axis of stress parallel to the axis of the curvature, wherein tensile stress along the axis of maximum tensile stress is greater than tensile stress along the second axis of stress.

15. The method of claim 12, wherein, opposite the apex of the curvature, a second major surface of the glass web comprises an axis of compressive stress parallel to the axis of the curvature.

16. The method of claim 12, wherein the axis of maximum tensile stress is coincident with the separation path.

17. The method of claim 12, wherein the separating comprise applying the defect to the portion of the first major surface at a location on the axis of maximum tensile stress.

18. The method of claim 12, wherein the producing a region of increased tension comprises imparting the curvature across an entire width of the glass web, and wherein the axis of maximum tensile stress extends along the entire width.

19. The method of claim 18, wherein the axis of maximum tensile stress comprises a uniform stress across the entire width of the glass web.

20. A method of processing a glass web including the method of separating the glass web of claim 1, the method comprising the steps of:

forming the glass web from a quantity of molten material with a process selected from the group consisting of: a fusion down draw process, a slot draw process, a float process, a down-draw process and an up-draw process; and separating the glass web in accordance with the method of claim 1.

* * * * *